US011192354B2

(12) United States Patent
Backer et al.

(10) Patent No.: US 11,192,354 B2
(45) Date of Patent: Dec. 7, 2021

(54) 3D PRINTING METHOD UTILIZING HEAT-CURABLE SILICONE COMPOSITION

(71) Applicant: DOW CORNING CORPORATION, Midland, MI (US)

(72) Inventors: Michael W. Backer, Mainz (DE); Zachary Milroy, Midland, MI (US); Sara Schaubroeck, Midland, MI (US); Hans Peter Wolf, Liederbach (DE); Bizhong Zhu, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 294 days.

(21) Appl. No.: 15/757,113

(22) PCT Filed: Sep. 2, 2016

(86) PCT No.: PCT/US2016/050023
§ 371 (c)(1),
(2) Date: Mar. 2, 2018

(87) PCT Pub. No.: WO2017/040874
PCT Pub. Date: Mar. 9, 2017

(65) Prior Publication Data
US 2018/0186076 A1    Jul. 5, 2018

Related U.S. Application Data

(60) Provisional application No. 62/213,945, filed on Sep. 3, 2015.

(51) Int. Cl.
| | |
|---|---|
| *B33Y 80/00* | (2015.01) |
| *B29C 64/112* | (2017.01) |
| *B33Y 70/00* | (2020.01) |
| *B33Y 10/00* | (2015.01) |
| *C08L 83/04* | (2006.01) |
| *B29C 64/118* | (2017.01) |
| *B29C 64/153* | (2017.01) |
| *B29C 64/295* | (2017.01) |
| *B29C 64/209* | (2017.01) |
| *C08G 77/12* | (2006.01) |
| *C08G 77/16* | (2006.01) |
| *B29K 83/00* | (2006.01) |

(52) U.S. Cl.
CPC ............ *B33Y 80/00* (2014.12); *B29C 64/112* (2017.08); *B29C 64/118* (2017.08); *B29C 64/153* (2017.08); *B29C 64/209* (2017.08); *B29C 64/295* (2017.08); *B33Y 10/00* (2014.12); *B33Y 70/00* (2014.12); *C08G 77/12* (2013.01); *C08G 77/16* (2013.01); *C08L 83/04* (2013.01); *B29K 2083/00* (2013.01)

(58) Field of Classification Search
CPC ... B29C 64/295; B29C 65/112; B29C 64/118; B29K 2083/00; B33Y 80/00; C08G 77/12
See application file for complete search history.

(56) References Cited

U.S. PATENT DOCUMENTS

| | | | |
|---|---|---|---|
| 4,766,176 A | 8/1988 | Lee et al. | |
| 4,780,260 A * | 10/1988 | Yoshida | B29C 39/025 106/38.22 |
| 4,783,289 A * | 11/1988 | Shimizu | B29C 48/834 264/28 |
| 5,017,654 A * | 5/1991 | Togashi | C08K 9/10 525/100 |
| 5,204,055 A | 4/1993 | Sachs et al. | |
| 5,387,380 A | 2/1995 | Cima et al. | |
| 5,679,727 A | 10/1997 | Griffith et al. | |
| 10,471,653 B2 | 11/2019 | Selbertinger et al. | |
| 10,612,986 B2 | 4/2020 | Lewis et al. | |
| 2005/0014005 A1 | 1/2005 | Kramer et al. | |
| 2009/0062456 A1 | 3/2009 | Rachita et al. | |
| 2010/0143421 A1* | 6/2010 | Van Reeth | C08J 3/241 424/401 |

(Continued)

FOREIGN PATENT DOCUMENTS

| | | |
|---|---|---|
| CN | 102186907 A | 9/2011 |
| CN | 104769043 A | 7/2015 |

(Continued)

OTHER PUBLICATIONS

Huang et al. "Studies on UV-stable silicone-epoxy resin", vol. 104, Issue-6 Journal of Applied Polymer Science, pp. 3954-3959 (Year: 2007).*
PCT/US2016/050023 International Search Report dated Nov. 17, 2016, 4 pages.
Jin, Yu-An; Plott, Jeff; Shih, Albert; "Extrusion-based Additive Manufacturing of the Moisture-Cured Silicone Elastomer", SciVerse ScienceDirect, 25th CIRP Design Conference, 6 pages.

(Continued)

*Primary Examiner* — Marc C Howell
*Assistant Examiner* — Debjani Roy
(74) *Attorney, Agent, or Firm* — Warner Norcross + Judd LLP

(57) ABSTRACT

A method of forming a three-dimensional (3D) article comprises the steps of I) printing a first heat-curable silicone composition with a 3D printer to form a layer, II) heating the layer to form an at least partially cured layer, III) printing a second heat-curable silicone composition on the at least partially cured layer with the 3D printer to form a subsequent layer, and IV) heating the subsequent layer to form an at least partially cured subsequent layer. Optionally, steps III) and IV) can be repeated with independently selected heat-curable silicone composition(s) for any additional layer(s) to form the 3D article. The first and second heat-curable silicone compositions may be the same as or different from one another.

13 Claims, No Drawings

(56) References Cited

U.S. PATENT DOCUMENTS

| | | |
|---|---|---|
| 2011/0196096 A1 | 8/2011 | Angermaier et al. |
| 2011/0300766 A1 | 12/2011 | Carbary et al. |
| 2012/0133079 A1 | 5/2012 | Sykes et al. |
| 2013/0056494 A1* | 3/2013 | Pires .............. G01F 11/021 222/137 |
| 2015/0084222 A1* | 3/2015 | Heston ............. B29C 64/118 264/40.7 |
| 2015/0183951 A1* | 7/2015 | Bhagwagar ........ C09J 183/14 524/430 |
| 2015/0263208 A1* | 9/2015 | Fisher ............. H01L 31/0481 136/259 |
| 2016/0003977 A1* | 1/2016 | Van De Vrie ...... B29C 64/112 362/311.03 |
| 2017/0283655 A1 | 10/2017 | Kenney et al. |
| 2018/0085993 A1* | 3/2018 | Biskop .............. B33Y 70/00 |

FOREIGN PATENT DOCUMENTS

| | | |
|---|---|---|
| CN | 105238064 A | 1/2016 |
| JP | 2005035299 A | 2/2005 |
| JP | 2007106070 A | 4/2007 |
| JP | 2010265436 A | 11/2010 |
| JP | 2012510487 A | 5/2012 |
| JP | 2012518061 A | 8/2012 |
| JP | 2015523456 A | 8/2015 |
| WO | WO2007040794 A1 | 4/2007 |
| WO | 2010063612 A1 | 6/2010 |
| WO | WO2014108364 A1 | 7/2014 |
| WO | 2014075073 A1 | 5/2015 |
| WO | WO2015069454 A1 | 5/2015 |
| WO | 2015083576 A1 | 6/2015 |
| WO | WO2015107333 A1 | 7/2015 |

OTHER PUBLICATIONS

Machine assisted English translation of JP2010265436A obtained from https://worldwide.espacenet.com on Mar. 19, 2019, 37 pages.
Machine assisted English translation of WO2015083576A1 obtained from https://worldwide.espacenet.com on Mar. 19, 2019, 22 pages.
Machine assisted English translation of JP2007106070A obtained from https://patents.google.com/patent on Jul. 17, 2020, 10 pages.
Machine assisted English translation of CN105238064A obtained from https://patents.google.com/patent on Feb. 18, 2021, 11 pages.

* cited by examiner

3D PRINTING METHOD UTILIZING HEAT-CURABLE SILICONE COMPOSITION

CROSS-REFERENCE TO RELATED APPLICATIONS

This application is the National Stage of International Application No. PCT/US2016/050023 filed on 2 Sep. 2016, which claims priority to and all advantages of U.S. Provisional Patent Application No. 62/213,945 filed on 3 Sep. 2015, the content of which is hereby incorporated by reference.

This application claims priority to and all advantages of US Pat. Appl. No. 62/213,945 filed on 3 Sep. 2015, the content of which is hereby incorporated by reference.

The present invention generally relates to a method of forming an article and, more specifically, to a method of forming a three-dimensional (3D) article utilizing a heat-curable silicone composition, and to a 3D article formed thereby.

3D printing or additive manufacturing (AM) is a process of making 3D solid objects, typically from a digital file. The creation of a 3D printed object is achieved using additive processes rather than subtractive processes. In an additive process, an object is created by laying down successive layers of material until the entire object is created. Each of these layers can be seen as a thinly sliced horizontal cross-section of the eventual object.

Additive processes have been demonstrated with certain limited types of materials, such as organic thermoplastics (e.g. polylactic acid (PLA) or acrylonitrile butadiene styrene (ABS)), plaster, clay, room temperature vulcanization (RTV) materials, paper, or metal alloys. These materials are unsuitable in certain end applications based on physical or chemical limitations, cost, slow solidification (or cure) times, improper viscosity, etc.

Other additive processes utilize heat-curable organic polymers. However, these conventional additive processes suffer from challenges associated with consistent and uniform heating and curing of various layers, particularly as the object is built with an increasing thickness during 3D printing.

In view of the foregoing, there remains an opportunity to provide improved methods of forming 3D articles as well as an opportunity to provide improved materials suitable for 3D printing.

BRIEF SUMMARY OF THE INVENTION

Disclosed is a method of forming a three-dimensional (3D) article. The method comprises I) printing a first heat-curable silicone composition with a 3D printer to form a layer. The method further comprises II) heating the layer to form an at least partially cured layer. In addition, the method comprises III) printing a second heat-curable silicone composition on the at least partially cured layer with the 3D printer to form a subsequent layer. The method also comprises IV) heating the subsequent layer to form an at least partially cured subsequent layer. Optionally, steps III) and IV) may be repeated with independently selected heat-curable silicone composition(s) for any additional layer(s) to form the 3D article. The first and second heat-curable silicone compositions are the same as or different from one another. Further, the first and second heat-curable silicone compositions are not cured via irradiation.

A 3D article formed in accordance with the method is also disclosed.

DETAILED DESCRIPTION

The term "about" as used herein serves to reasonably encompass or describe minor variations in numerical values measured by instrumental analysis or as a result of sample handling. Such minor variations may be in the order of plus or minus 0% to 10% or plus or minus 0% to 5% of the numerical values.

The term "branched" as used herein describes a polymer with more than two end groups.

The term "comprising" is used herein in its broadest sense to mean and to encompass the notions of "include" and "consist of."

The term "ambient temperature" or "room temperature" refers to a temperature between about 20° C. and about 30° C. Usually, room temperature ranges from about 20° C. to about 25° C.

The use of "for example" or "such as" to list illustrative examples does not limit to only the listed examples. Thus, "for example" or "such as" means "for example, but not limited to" or "such as, but not limited to" and encompasses other similar or equivalent examples.

The term "substituted" as used in relation to another group, for example, a hydrocarbon group, means, unless indicated otherwise, one or more hydrogen atoms in the hydrocarbon group has been replaced with another substituent. Examples of such substituents include, for example, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amines, amino-functional groups, amido-functional groups, and cyano-functional groups; sulphur atoms; and sulphur atom containing groups such as mercapto groups.

All viscosity measurements referred to herein were measured at 25° C. unless otherwise indicated.

An organopolysiloxane means a polymer or resin comprising multiple organosiloxane or polyorganosiloxane groups per molecule. Organopolysiloxane is intended to include polymers substantially containing only organosiloxane or polyorganosiloxane groups in the polymer chain, and polymers where the backbone contains both organosiloxane and/or polyorganosiloxane groups and organic polymer groups in the polymer chain. Such polymers may be homopolymers or copolymers, including, for example, block copolymers and random copolymers. Organopolysiloxane is also intended to include resins having a three-dimensional crosslinked network.

Disclosed is a method of forming a three-dimensional (3D) article ("method"). The 3D article is formed with independently selected heat-curable silicone compositions, which are also described below, along with various aspects relating to the 3D articles formed in accordance with the inventive method.

Method

The method comprises the step of I) printing a first heat-curable silicone composition with a 3D printer to form a layer. Various types of 3D printers and/or 3D printing methodologies (i.e., "3D printing processes") can be used as described in detail below. As also described below, various types of heat-curable silicone compositions can be utilized in the inventive method.

The first heat-curable silicone composition is generally printed on a substrate such that the layer is formed on the substrate. The substrate is not limited and may be any substrate. The substrate typically can support the 3D article during its method of forming. However, the substrate may itself be supported, e.g. by a table, such that the substrate itself need not have rigidity. The substrate may be rigid or flexible, and may be discontinuous or continuous in at least one of thickness and composition. The substrate may include a coating or other film such that the substrate is removable, e.g. peelable, from the 3D article. Alternatively, the 3D article may physically and/or chemically bond to the substrate such that the 3D article and the substrate are together. In one embodiment, the substrate may comprise a silicone, e.g. an already cured silicone, such that the substrate becomes integral with the 3D article. The substrate may be a mold or any other object or article.

The layer formed by printing the first heat-curable silicone composition may have any shape and dimension. For example, the layer need not be continuous, as in a conventional layer. The layer need not have a consistent thickness. Depending on a desired shape of the 3D article formed by the method, the layer may take any form.

The method further comprises the step of II) heating the layer to form an at least partially cured layer. As used herein, "at least partially cured" means that curing of the silicone composition, in this case the first heat-curable silicone composition, has been initiated, e.g. cross-linking of components has commenced. Cross-linking of the first heat-curable silicone composition generally commences upon the application of heat, which is a curing condition for the first heat-curable silicone composition. As understood in the art, the rate and mechanism with which the first heat-curable silicone composition cures is contingent on various factors, including the components thereof, functional groups of the components, parameters of the curing condition, etc. "At least partially cured" encompasses any amount of cure upon application of the curing condition, from the formation of a single crosslink to a fully cross-linked state.

The step of II) heating the layer to form an at least partially cured layer generally comprises heating the layer at an elevated temperature for a period of time. The elevated temperature and the period of time may vary based on numerous factors, including the selection of the first heat-curable silicone composition, a desired cross-link density of the at least partially cured layer, dimensions of the layer, etc. In certain embodiments, the elevated temperature is from above room temperature to 300, alternatively from 30 to 250, alternatively from 40 to 200, alternatively from 50 to 150, ° C. In these or other embodiments, the period of time is from 0.001 to 600, alternatively from 0.04 to 60, alternatively from 0.1 to 10, alternatively from 0.1 to 5, alternatively from 0.2 to 2, minutes.

Any source of heat may be utilized during the step of II) heating the layer. For example, the source of heat may be a convection oven, rapid thermal processing, a hot bath, a hot plate, or radiant heat. Further, if desired, a heat mask or other similar device may be utilized for selective curing of the layer, particularly if any partial or selective intermixing with a subsequent layer, as described below, is desired.

In certain embodiments, the step of II) heating is selected from (i) conductive heating via a substrate on which the layer is printed; (ii) heating the first heat-curable silicone composition via the 3D printer or a component thereof; (iii) infrared heating; (iv) electromagnetic heating; (v) a heating bath with a heat transfer fluid; (vi) heating from an exothermic reaction of the first heat-curable silicone composition; (vii) magnetic heating; and (viii) combinations thereof.

Such heating techniques are known in the art. For example, the heat transfer fluid is generally an inert fluid, e.g. water, which may surround and contact the layer as the first heat-curable silicone composition is printed, thus initiating at least partial curing thereof. With respect to (ii) heating the first heat-curable silicone composition via the 3D printer or a component thereof, any portion of the first heat-curable silicone composition may be heated and combined with the remaining portion, or the first heat-curable silicone composition may be heated in its entirety. For example, a portion (e.g. one component) of the first heat-curable silicone composition may be heated, and, once combined with the remaining portion, the first heat-curable silicone composition initiates curing. The combination of the heated portion and remaining portion may be before, during, and/or after the step of printing the first-heat curable silicone composition. The components may be separately printed.

At least partial solidification of the layer is generally indicative of cure; however, cure may be indicated in other ways. For example, curing may be indicated by a viscosity increase, e.g. bodying of the layer, an increased temperature of the layer, a transparency/opacity change of the layer, an increased surface or bulk hardness, etc. Generally, physical and/or chemical properties of the layer are modified as the layer at least partially cures to provide the at least partially cured layer.

In certain embodiments, the at least partially cured layer substantially retains its shape upon exposure to ambient conditions. Ambient conditions refer to at least temperature, pressure, relative humidity, and any other condition that may impact a shape or dimension of the at least partially cured layer. For example, ambient temperature is room temperature. Ambient conditions are distinguished from curing conditions, where heat (or elevated temperature) is applied. By "substantially retains its shape," it is meant that a majority of the at least partially cured layer retains its shape, e.g. the at least partially cured layer does not flow or deform upon exposure to ambient conditions. Substantially may mean that at least about 50%, 60%, 70%, 80%, 90%, 95%, 96%, 97%, 98%, 99%, 99.5%, 99.9%, 99.99%, or at least about 99.999% or more of the volume of the at least partially cured layer is maintained in the same shape and dimension over a period of time, e.g. after 1 minute, 5 minutes, 10 minutes, 30 minutes, 1 hour, 4 hours, 8 hours, 12 hours, 1 day, 1 week, 1 month, etc. Said differently, substantially retaining shape means that gravity does not substantially impact shape of the at least partially cured layer upon exposure to ambient conditions. The shape of the at least partially cured layer may also impact whether the at least partially cured layer substantially retains its shape. For example, when the at least partially cured layer is rectangular or has another simplistic shape, the at least partially cured layer may be more resistant to deformation at even lesser levels of cure than at least partially cured layers having more complex shapes.

More specifically, prior to the application of heat, the first heat-curable silicone composition is generally flowable and may be in the form of a liquid, slurry, or gel, alternatively a liquid or slurry, alternatively a liquid. Viscosity of the first heat-curable silicone composition can be adjusted depending on the type of 3D printer and its dispensing technique or other considerations. Adjusting viscosity can be achieved, for example, by heating or cooling the first heat-curable silicone composition, adjusting molecular weight of one or more components thereof, by adding or removing a solvent, carrier, and/or diluent, by adding a filler or thixotroping agent, etc.

The method further comprises the step of III) printing a second heat-curable silicone composition on the at least partially cured layer with the 3D printer to form a subsequent layer. The 3D printer may be the same as or different from the 3D printer utilized in step I). As described below, the second heat-curable silicone composition may be the same as or different from the first heat-curable silicone composition. The layer (or first, prior, or previous layer), subsequent layer (or second or latter layer), and any additional layer(s), optionally present as described below, are collectively referred to herein as "the layers." "The layers," as used herein in plural form, may relate to the layers at any stage of the inventive method, e.g. in an uncured state, in a partially cured state, in a final cure state, etc. The term "layer" in singular form designates the first layer printed with the first heat-curable silicone composition.

As with the layer, the subsequent layer formed by printing the second heat-curable silicone composition may have any shape and dimension. For example, the subsequent layer need not be continuous or have a consistent thickness. Further, the subsequent layer may differ from the layer in terms of shape, dimension, size, etc. The subsequent layer may only contact a portion of an exposed surface of the at least partially cured layer. For example, depending on the desired shape of the 3D article, the subsequent layer may build on the layer selectively.

In certain embodiments, printing of the subsequent layer occurs before the at least partially cured layer has reached a final cure state, i.e., while the at least partially cured layer is still "green." As used herein, "green" encompasses a partial cure but not a final cure state. The distinction between partial cure and a final cure state is whether the partially cured layer can undergo further curing or crosslinking. Functional groups may be present even in the final cure state, but may remain unreacted due to steric hindrance or other factors. In these embodiments, printing of the layers may be considered "wet-on-wet" such that the adjacent layers at least physically bond, and may also chemically bond, to one another. For example, it is possible that components in each of the layers chemically cross-link/cure across the print line. There may be certain advantages in having the cross-link network extend across the print line in relation to longevity, durability and appearance of the 3D article. The layers may also be formed around one or more substructures that can provide support or another function of the 3D article.

The layers can each be of various dimensions, including thickness and width. Thickness and/or width tolerances of the layers may depend on the 3D printing process used, with certain printing processes having high resolutions and others having low resolutions. Thicknesses of the layers can be uniform or may vary, and average thicknesses of the layers can be the same or different. Average thickness is generally associated with thickness of the layer immediately after printing. In various embodiments, the layers independently have an average thickness of from about 1 to about 10,000, about 2 to about 1,000, about 5 to about 750, about 10 to about 500, about 25 to about 250, or about 50 to 100, μm. Thinner and thicker thicknesses are also contemplated. This disclosure is not limited to any particular dimensions of any of the layers.

The method yet further comprises the step of IV) heating the subsequent layer to form an at least partially cured subsequent layer. The step of IV) heating the subsequent layer may be the same as or different from the step of II) heating the layer in terms of the curing condition and associated parameters applied. Further, the step of IV) heating the subsequent layer may be the same as or different from the step of II) heating the layer in terms of the source of heat utilized.

As with step II), the step of IV) heating the subsequent layer to form an at least partially cured subsequent layer generally comprises heating the subsequent layer at an elevated temperature for a period of time. In various embodiments, the elevated temperature and the period of time are those which are defined above relative to step II). Even in these embodiments, the particular elevated temperature and particular period of time may be independently selected in steps II) and IV). As but one example, when the elevated temperature is from above room temperature to 300° C., step II) may utilize 100° C. and step IV) may utilize 150° C.

Like in step II), in certain embodiments, the step of IV) heating may be independently selected from (i) conductive heating via the substrate and the at least partially cured layer on which the subsequent layer is disposed; (ii) heating the particular heat-curable silicone composition via the 3D printer or a component thereof; (iii) infrared heating; (iv) electromagnetic heating; (v) a heating bath with a heat transfer fluid; (vi) heating from an exothermic reaction of the particular heat-curable silicone composition; (vii) magnetic heating; and (viii) combinations thereof.

Optionally, steps III) and IV) can be repeated for any additional layer(s) to form the 3D article. If steps III) and IV) are repeated, independently selected heat-curable silicone compositions may be utilized in connection with each subsequent layer, which may be the same as or different from the first and/or second heat-curable silicone compositions, as described below. The total number of layers required will depend, for example, on the size and shape of the 3D article, as well as dimensions of the individual and collective layers. One of ordinary skill can readily determine how many layers are required or desired using conventional techniques, such as 3D scanning, rendering, modeling (e.g. parametric and/or vector based modeling), sculpting, designing, slicing, manufacturing and/or printing software. In certain embodiments, once the 3D article is in a final cure state, the individual layers are generally not identifiable and the 3D article has a continuous and desirable aesthetic.

When the layers are applied wet-on-wet, and/or when the layers are only partially cured, the step of IV) heating may effect cure of more than just the subsequently printed layer. As noted above, because the cure may extend beyond or across the print line, and because a composite including the various layers is typically subjected to the curing condition, any other partially cured layers may also further, alternatively fully, cure upon a subsequent step of heating.

If desired, inserts, which may have varying shape, dimension, and be comprised of any suitable material, may be disposed or placed on or at least partially in any layer during the inventive method. For example, an insert may be utilized in between subsequent printing steps, and the insert may become integral with the 3D article upon its formation. Alternatively, the insert may be removed at any step during the inventive method, e.g. to leave a cavity or for other functional or aesthetic purposes. The use of such inserts may provide better aesthetics and economics over relying on printing alone.

Further, if desired, a composite including all or some of the layers may be subjected to a final cure step. For example, to ensure that the 3D article is at a desired cure state, a composite formed by printing and at least partially curing the layers may be subjected to a further step of heat curing. The composite may, for example, be placed in an oven and subjected to the final cure step. The final cure step, if desired, may be the same as or different from steps II) or IV) in terms of curing condition, associated parameters, and source of heat utilized.

In various embodiments, the 3D printer is selected from a fused filament fabrication printer, a selective laser sintering printer, a selective laser melting printer, a stereolithography printer, a powder bed (binder jet) printer, a material jet printer, a direct metal laser sintering printer, an electron beam melting printer, a laminated object manufacturing deposition printer, a directed energy deposition printer, a laser powder forming printer, a polyjet printer, an ink-jetting printer, a material jetting printer, and a syringe extrusion printer. The 3D printer may be independently selected during each printing step associated with the inventive method. Said differently, if desired, each printing step may utilize a different 3D printer. Different 3D printers may be utilized to impart different characteristics with respect to the layers, and different 3D printers may be particularly well suited for different types of heat-curable silicone compositions.

This disclosure generally incorporates ASTM Designation F2792-12a, "Standard Terminology for Additive Manufacturing Technologies," by reference in its entirety. Under this ASTM standard, "3D printer" is defined as "a machine used for 3D printing" and "3D printing" is defined as "the fabrication of objects through the deposition of a material using a print head, nozzle, or another printer technology." "Additive manufacturing (AM)" is defined as "a process of joining materials to make objects from 3D model data, usually layer upon layer, as opposed to subtractive manufacturing methodologies. Synonyms associated with and encompassed by 3D printing include additive fabrication, additive processes, additive techniques, additive layer manufacturing, layer manufacturing, and freeform fabrication." AM may also be referred to as rapid prototyping (RP). As used herein, "3D printing" is generally interchangeable with "additive manufacturing" and vice versa.

The method of this disclosure can mimic any one of the aforementioned 3D printing processes, or other 3D printing processes understood in the art. Specific examples of suitable 3D printing processes are also described in U.S. Pat. Nos. 5,204,055 and 5,387,380, the disclosures of which are incorporated by reference.

3D printing is generally associated with a host of related technologies used to fabricate physical objects from computer generated data sources. Some of these specific processes are included above with reference to specific 3D printers. Further, some of these processes, and others, are described in greater detail below.

In general, all 3D printing processes have a common starting point, which is a computer generated data source or program which may describe an object. The computer generated data source or program can be based on an actual or virtual object. For example, an actual object can be scanned using a 3D scanner and scan data can be used to make the computer generated data source or program. Alternatively, the computer generated data source or program may be designed from scratch.

The computer generated data source or program is typically converted into a standard tessellation language (STL) file format; however, other file formats can also or additionally be used. The file is generally read into 3D printing software, which takes the file and optionally user input to separate it into hundreds, thousands or even millions of "slices." The 3D printing software typically outputs machine instructions, which may be in the form of G-code, which is read by the 3D printer to build each slice. The machine instructions are transferred to the 3D printer, which then builds the object—layer by layer—based on this slice information in the form of machine instructions. Thicknesses of these slices may vary.

Regardless of the particular 3D printer and 3D printing process utilized in the method, ambient conditions may be manipulated or controlled. For example, if desired, the substrate may be heated before, during, and/or after the steps of printing to assist with curing. Further, the substrate could be moved, e.g. rotated, during any printing step. Typically, the 3D printer utilizes a dispenser, e.g. a nozzle or printhead, for printing the particular heat-curable silicone composition. The dispenser may be heated before, during, and after dispensing the particular heat-curable silicone composition. More than one dispenser may be utilized with each dispenser having independently selected properties. The method may be carried out in a heated environment such that curing initiates after each step of printing. Alternatively or in addition, a heat source may be stationary or moveable relative to the 3D printer.

In various embodiments, the method of this disclosure mimics a conventional material extrusion process. Material extrusion generally works by extruding material through a nozzle to print one cross-section of an object, which may be repeated for each subsequent layer. In the method, and unlike conventional processes, the material comprises the first and/or second heat-curable silicone compositions of this disclosure. The nozzle may be heated to contribute to forming the at least partially cured layer in situ during the printing steps. Heating of the nozzle may also aid in dispensing the particular heat-curable silicone composition. Further, a heat source may be passed over or adjacent the layer formed by printing to initiate and/or further cure the layer to form the at least partially cured layer.

With this process, the material, i.e., first and/or second heat-curable silicone compositions, is typically in the form of a slurry, gel, or paste during extrusion. The extruded material may be heated to form the at least partially cured layer. Repeating this process builds upon an object one layer at a time to ultimately form the 3D article. In certain embodiments, utilizing thinner cross-sections provides aesthetic and/or performance advantages with respect to the 3D article.

The nozzle and/or build platform generally moves in the X-Y (horizontal) plane before moving in the Z-axis (vertical) plane once each layer is complete. In this way, the object which becomes the 3D article is built one layer at a time from the bottom upwards. This process can use material for two different purposes, building the object and supporting overhangs in order to avoid extruding material into thin air.

In various embodiments, the method of this disclosure mimics a conventional material jetting process. Material jetting printers often resemble traditional paper printers, e.g. inkjet printers. In material jetting, a print head moves around a print area jetting the particular heat-curable silicone composition. Repeating this process builds up the object one layer at a time.

Optionally, the resulting objects may be subjected to different post-processing regimes, such as further heating, infiltration, bakeout, and/or firing. This may be done, for example, to expedite cure of any binder, to reinforce the 3D article, eliminate any curing/cured binder (e.g. by decomposition), to consolidate the core material (e.g. by sintering/ melting), and/or to form a composite material blending the properties of powder and binder.

Composition

The first and second heat-curable silicone compositions may be the same as or different from one another, and when steps III) and IV) are repeated, independently selected heat-curable silicone compositions may be utilized. For purposes of brevity, the first and second heat-curable silicone composition, along with any other heat-curable silicone compositions optionally utilized when steps III) and IV) are repeated, are referred to below collectively merely as "the heat-curable silicone composition," "each of the heat-curable silicone compositions," or "at least one of the heat-curable silicone compositions." Reference to such terms or phrases may refer to any of the heat-curable silicone compositions utilized in the method, and despite being referred to collectively, each of the heat-curable silicone compositions may be independently selected.

Various heat-curable silicone compositions are described below. The first and second heat-curable silicone compositions, along with any independently selected heat-curable silicone compositions utilized to form additional layers when optionally repeating steps III) and IV), may be any silicone compositions which cure in the presence of the curing condition, i.e., heat. Specific examples of heat-curable silicone compositions suitable for the inventive method are disclosed below. In various embodiments, each of the heat-curable silicone compositions is selected from those described below.

The heat-curable silicone compositions utilized in the inventive method are not cured via irradiation. Said differently, as described above, the method utilizes heat rather than any other curing condition, e.g. irradiation, for curing the heat-curable silicone compositions and layers formed therewith. As understood in the art, certain silicone compositions may cure via a variety of different curing conditions, e.g. heat and/or irradiation.

In certain embodiments, heat-curable silicone compositions that may also be radiation-curable are within the scope of heat-curable silicone compositions so long as curing reactions of such heat-curable silicone compositions are initiated and maintained via the application of heat rather than directly by irradiation. Radiation utilized to provide heat to initiate and maintain curing is also within the scope of heat-curable silicone compositions in these embodiments. In other embodiments, heat-curable silicone compositions are not radiation-curable. In these latter embodiments, the heat-curable silicone compositions do not cure upon the application of irradiation as a curing condition.

In certain embodiments, each of the heat-curable silicone compositions is independently selected from condensation-curable silicone compositions, hydrosilylation-curable silicone compositions, free radical-curable silicone compositions, ring opening reaction-curable silicone compositions, and dual-cure silicone compositions. When additional independently selected heat-curable silicone compositions are utilized in the method, such heat-curable silicone compositions are typically independently selected from those set forth above. Notably, the first and second heat-curable silicone compositions may have the same cure mechanism upon application of the curing condition, i.e., heat, but may still be independently selected from one another. For example, the first heat-curable silicone composition may comprise a condensation-curable silicone composition, and the second heat-curable silicone composition may also comprise a condensation-curable silicone composition, wherein the condensation-curable silicone compositions differ from one another, e.g. by components, relative amounts thereof, etc.

In certain embodiments, the heat-curable silicone compositions are the same as one another. In other embodiments, the heat-curable silicone compositions are different from one another.

In certain embodiments, each of the heat-curable silicone compositions utilized in the method cures via the same cure mechanism upon application of the curing condition, i.e., heat. These embodiments easily allow for cure across the print line, if desired, as the components of in each of the heat-curable silicone compositions may readily react with one another in view of having the same cure mechanism upon application of the curing condition, i.e., heat. In these embodiments, each of the heat-curable silicone compositions may still differ from one another in terms of the actual components utilized and relative amounts thereof, even though the cure mechanism is the same in each of the heat-curable silicone compositions. In contrast, although there may be some cure across the print line when each of the layers cures via a different mechanism (e.g. hydrosilylation versus condensation), components in these layers may not be able to react with one another upon application of the curing condition, i.e., heat, which may be desirable in other applications.

In certain embodiments, at least one of the heat-curable silicone compositions comprises a hydrosilylation-curable silicone composition. In these embodiments, the hydrosilylation-curable silicone composition typically comprises: (A) an organopolysiloxane having an average of at least two silicon-bonded alkenyl groups or silicon-bonded hydrogen atoms per molecule; (B) an organosilicon compound having an average of at least two silicon-bonded hydrogen atoms or silicon-bonded alkenyl groups per molecule capable of reacting with the silicon-bonded alkenyl groups or silicon-bonded hydrogen atoms in the organopolysiloxane (A); and (C) a hydrosilylation catalyst. When the organopolysiloxane (A) includes silicon-bonded alkenyl groups, the organosilicon compound (B) includes at least two silicon-bonded hydrogen atoms per molecule, and when the organopolysiloxane (A) includes silicon-bonded hydrogen atoms, the organosilicon compound (B) includes at least two silicon-bonded alkenyl groups per molecule. The organosilicon compound (B) may be referred to as a cross-linker or cross-linking agent.

The organopolysiloxane (A) and the organosilicon compound (B) may independently be linear, branched, cyclic, or resinous. In particular, the organopolysiloxane (A) and the organosilicon compound (B) may comprise any combination of M, D, T, and Q units. The symbols M, D, T, and Q represent the functionality of structural units of organopolysiloxanes. M represents the monofunctional unit $R^0{}_3SiO_{1/2}$. D represents the difunctional unit $R^0{}_2SiO_{2/2}$. T represents the trifunctional unit $R^0SiO_{3/2}$. Q represents the tetrafunctional unit $SiO_{4/2}$. Generic structural formulas of these units are shown below:

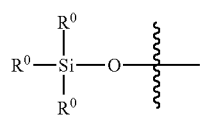

[M]

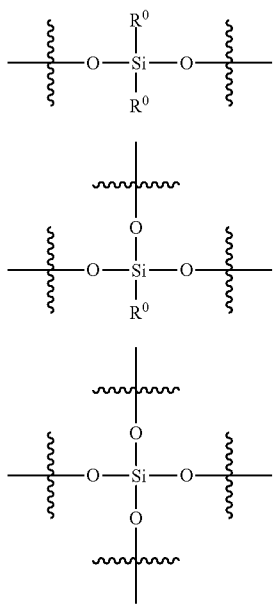

In these structures/formulae, each $R^0$ may be any hydrocarbon, aromatic, aliphatic, alkyl, alkenyl, or alkynl group.

The particular organopolysiloxane (A) and organosilicon compound (B) may be selected based on desired properties of the 3D article and layers during the inventive method. For example, it may be desirable for the layers to be in the form of an elastomer, a gel, a resin, etc., and selecting the components of the heat-curable silicone composition allows one of skill in the art to achieve a range of desirable properties.

For example, in certain embodiments, one of the organopolysiloxane (A) and the organosilicon compound (B) comprises a silicone resin, which typically comprises T and/or Q units in combination with M and/or D units. When the organopolysiloxane (A) and/or organosilicon compound (B) comprises a silicone resin, the silicone resin may be a DT resin, an MT resin, an MDT resin, a DTQ resin, an MTQ resin, an MDTQ resin, a DQ resin, an MQ resin, a DTQ resin, an MTQ resin, or an MDQ resin. Generally, when the hydrosilylation-curable silicone composition comprises a resin, the layer(s) and resulting 3D article have increased rigidity.

Alternatively, in other embodiments, the organopolysiloxane (A) and/or the organosilicon compound (B) is an organopolysiloxane comprising repeating D units. Such organopolysiloxanes are substantially linear but may include some branching attributable to T and/or Q units. Alternatively, such organopolysiloxanes are linear. In these embodiments, the layer(s) and resulting 3D article are elastomeric.

The silicon-bonded alkenyl groups and silicon-bonded hydrogen atoms of the organopolysiloxane (A) and the organosilicon compound (B), respectively, may independently be pendent, terminal, or in both positions.

In a specific embodiment, the organopolysiloxane (A) has the general formula:

$$(R^1R^2_2SiO_{1/2})_w(R^2_2SiO_{2/2})_x(R^2SiO_{3/2})_y(SiO_{4/2})_z \quad (I)$$

wherein each $R^1$ is an independently selected hydrocarbyl group, which may be substituted or unsubstituted, and each $R^2$ is independently selected from $R^1$ and an alkenyl group, with the proviso that at least two of $R^2$ are alkenyl groups, and w, x, y, and z are mole fractions such that $w+x+y+z=1$. As understood in the art, for linear organopolysiloxanes, subscripts y and z are generally 0, whereas for resins, subscripts y and/or $z>0$. Various alternative embodiments are described below with reference to w, x, y and z. In these embodiments, the subscript w may have a value of from 0 to 0.9999, alternatively from 0 to 0.999, alternatively from 0 to 0.99, alternatively from 0 to 0.9, alternatively from 0.9 to 0.999, alternatively from 0.9 to 0.999, alternatively from 0.8 to 0.99, alternatively from 0.6 to 0.99. The subscript x typically has a value of from 0 to 0.9, alternatively from 0 to 0.45, alternatively from 0 to 0.25. The subscript y typically has a value of from 0 to 0.99, alternatively from 0.25 to 0.8, alternatively from 0.5 to 0.8. The subscript z typically has a value of from 0 to 0.99, alternatively from 0 to 0.85, alternatively from 0.85 to 0.95, alternatively from 0.6 to 0.85, alternatively from 0.4 to 0.65, alternatively from 0.2 to 0.5, alternatively from 0.1 to 0.45, alternatively from 0 to 0.25, alternatively from 0 to 0.15.

In certain embodiments, each $R^1$ is a $C_1$ to $C_{10}$ hydrocarbyl group, which may be substituted or unsubstituted, and which may include heteroatoms within the hydrocarbyl group, such as oxygen, nitrogen, sulfur, etc. Acyclic hydrocarbyl and halogen-substituted hydrocarbyl groups containing at least three carbon atoms can have a branched or unbranched structure. Examples of hydrocarbyl groups represented by $R^1$ include, but are not limited to, alkyl groups, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, and decyl; cycloalkyl groups, such as cyclopentyl, cyclohexyl, and methylcyclohexyl; aryl groups, such as phenyl and naphthyl; alkaryl groups, such as tolyl and xylyl; and aralkyl groups, such as benzyl and phenethyl. Examples of halogen-substituted hydrocarbyl groups represented by $R^1$ include, but are not limited to, 3,3,3-trifluoropropyl, 3-chloropropyl, chlorophenyl, dichlorophenyl, 2,2,2-trifluoroethyl, 2,2,3,3-tetrafluoropropyl, and 2,2,3,3,4,4,5,5-octafluoropentyl.

The alkenyl groups represented by $R^2$, which may be the same or different within the organopolysiloxane (A), typically have from 2 to 10 carbon atoms, alternatively from 2 to 6 carbon atoms, and are exemplified by, for example, vinyl, allyl, butenyl, hexenyl, and octenyl.

In these embodiments, the organosilicon compound (B) may be further defined as an organohydrogensilane, an organopolysiloxane an organohydrogensiloxane, or a combination thereof. The structure of the organosilicon compound (B) can be linear, branched, cyclic, or resinous. In acyclic polysilanes and polysiloxanes, the silicon-bonded hydrogen atoms can be located at terminal, pendant, or at both terminal and pendant positions. Cyclosilanes and cyclosiloxanes typically have from 3 to 12 silicon atoms, alternatively from 3 to 10 silicon atoms, alternatively from 3 to 4 silicon atoms. The organohydrogensilane can be a monosilane, disilane, trisilane, or polysilane.

Hydrosilylation catalyst (C) includes at least one hydrosilylation catalyst that promotes the reaction between the organopolysiloxane (A) and the organosilicon compound (B). The hydrosilylation catalyst (C) can be any of the well-known hydrosilylation catalysts comprising a platinum group metal (i.e., platinum, rhodium, ruthenium, palladium, osmium and iridium) or a compound containing a platinum group metal. Typically, the platinum group metal is platinum, based on its high activity in hydrosilylation reactions.

Specific hydrosilylation catalysts suitable for (C) include the complexes of chloroplatinic acid and certain vinyl-containing organosiloxanes disclosed by Willing in U.S. Pat. No. 3,419,593, the portions of which address hydrosilylation catalysts are hereby incorporated by reference. A catalyst of this type is the reaction product of chloroplatinic acid and 1,3-diethenyl-1,1,3,3-tetramethyldisiloxane.

The hydrosilylation catalyst (C) can also be a supported hydrosilylation catalyst comprising a solid support having a platinum group metal on the surface thereof. A supported catalyst can be conveniently separated from organopolysiloxanes, for example, by filtering the reaction mixture. Examples of supported catalysts include, but are not limited to, platinum on carbon, palladium on carbon, ruthenium on carbon, rhodium on carbon, platinum on silica, palladium on silica, platinum on alumina, palladium on alumina, and ruthenium on alumina.

In addition or alternatively, the hydrosilylation catalyst (C) can also be a microencapsulated platinum group metal-containing catalyst comprising a platinum group metal encapsulated in a thermoplastic resin. Hydrosilylation-curable silicone compositions including microencapsulated hydrosilylation catalysts are stable for extended periods of time, typically several months or longer, under ambient conditions, yet cure relatively rapidly at temperatures above the melting or softening point of the thermoplastic resin(s). Microencapsulated hydrosilylation catalysts and methods of preparing them are well known in the art, as exemplified in U.S. Pat. No. 4,766,176 and the references cited therein, and U.S. Pat. No. 5,017,654. The hydrosilylation catalyst (C) can be a single catalyst or a mixture comprising two or more different catalysts that differ in at least one property, such as structure, form, platinum group metal, complexing ligand, and thermoplastic resin.

The concentration of the hydrosilylation catalyst (C) is sufficient to catalyze the addition reaction between the organopolysiloxane (A) and the organosilicon compound (B). In certain embodiments, the concentration of the hydrosilylation catalyst (C) is sufficient to provide typically from 0.1 to 1000 ppm of platinum group metal, alternatively from 0.5 to 100 ppm of platinum group metal, alternatively from 1 to 25 ppm of platinum group metal, based on the combined weight of the organopolysiloxane (A) and the organosilicon compound (B).

The hydrosilylation-curable silicone composition may be a two-part composition where the organopolysiloxane (A) and organosilicon compound (B) are in separate parts. In these embodiments, the hydrosilylation catalyst (C) may be present along with either or both of the organopolysiloxane (A) and organosilicon compound (B). Alternatively still, the hydrosilylation catalyst (C) may be separate from the organopolysiloxane (A) and organosilicon compound (B) in a third part such that the hydrosilylation reaction-curable silicone composition is a three-part composition.

In one specific embodiment the hydrosilylation-curable silicone composition comprises $ViMe_2(Me_2SiO)_{128}SiMe_2Vi$ as the organopolysiloxane (A), $Me_3SiO(Me_2SiO)_{14}(MeHSiO)_{16}SiMe_3$ as the organosilicon compound (B) and a complex of platinum with divinyltretramethyldisiloxane as (C) such that platinum is present in a concentration of 5 ppm based on (A), (B) and (C).

In these or other embodiments, at least one of the heat-curable silicone compositions comprises a condensation-curable silicone composition. In these embodiments, the condensation-curable silicone composition typically comprises (A') an organopolysiloxane having an average of at least two silicon-bonded hydroxyl or hydrolysable groups per molecule; optionally (B') an organosilicon compound having an average of at least two silicon-bonded hydrogen atoms, hydroxyl groups, or hydrolysable groups per molecule; and (C') a condensation catalyst. Although any parameter or condition may be selectively controlled during the inventive method or any individual step thereof, relative humidity and/or moisture content of ambient conditions may be selectively controlled to further impact a cure rate of condensation-curable silicone compositions.

The organopolysiloxane (A') and the organosilicon compound (B') may independently be linear, branched, cyclic, or resinous. In particular, the organopolysiloxane (A') and the organosilicon compound (B') may comprise any combination of M, D, T, and Q units, as with the organopolysiloxane (A') and the organosilicon compound (B') disclosed above.

The particular organopolysiloxane (A') and organosilicon compound (B') may be selected based on desired properties of the 3D article and layers during the inventive method. For example, it may be desirable for the layers to be in the form of an elastomer, a gel, a resin, etc., and selecting the components of the heat-curable silicone composition allows one of skill in the art to achieve a range of desirable properties.

For example, in certain embodiments, one of the organopolysiloxane (A') and the organosilicon compound (B') comprises a silicone resin, which typically comprises T and/or Q units in combination with M and/or D units. When the organopolysiloxane (A') and/or organosilicon compound (B') comprises a silicone resin, the silicone resin may be a DT resin, an MT resin, an MDT resin, a DTQ resin, an MTQ resin, an MDTQ resin, a DQ resin, an MQ resin, a DTQ resin, an MTQ resin, or an MDQ resin. Generally, when the condensation-curable silicone composition comprises a resin, the layer(s) and resulting 3D article have increased rigidity.

Alternatively, in other embodiments, the organopolysiloxane (A') and/or the organosilicon compound (B') is an organopolysiloxane comprising repeating D units. Such organopolysiloxanes are substantially linear but may include some branching attributable to T and/or Q units. Alternatively, such organopolysiloxanes are linear. In these embodiments, the layer(s) and resulting 3D article are elastomeric.

The silicon-bonded hydroxyl groups and silicon-bonded hydrogen atoms, hydroxyl groups, or hydrolysable groups of the organopolysiloxane (A') and the organosilicon compound (B'), respectively, may independently be pendent, terminal, or in both positions.

As known in the art, silicon-bonded hydroxyl groups result from hydrolyzing silicon-bonded hydrolysable groups. These silicon-bonded hydroxyl groups may condense to form siloxane bonds with water as a byproduct.

Examples of hydrolysable groups include the following silicon-bonded groups: H, a halide group, an alkoxy group, an alkylamino group, a carboxy group, an alkyliminoxy group, an alkenyloxy group, or an N-alkylamido group. Alkylamino groups may be cyclic amino groups.

In a specific embodiment, the organopolysiloxane (A') has the general formula:

$$(R^1R^3{}_2SiO_{1/2})_{w'}(R^3{}_2SiO_{2/2})_{x'}(R^3SiO_{3/2})_{y'}(SiO_{4/2})_{z'}, \quad (II)$$

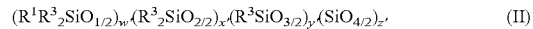

wherein each $R^1$ is defined above and each $R^3$ is independently selected from $R^1$ and a hydroxyl group, a hydrolysable group, or combinations thereof with the proviso that at least two of $R^3$ are hydroxyl groups, hydrolysable groups, or combinations thereof, and w', x', y', and z' are mole fractions such that w'+x'+y'+z'=1. As understood in the art, for linear organopolysiloxanes, subscripts y' and z' are generally 0, whereas for resins, subscripts y' and/or z'>0. Various alternative embodiments are described below with reference to w', x', y' and z'. In these embodiments, the subscript w' may have a value of from 0 to 0.9999, alternatively from 0 to 0.999, alternatively from 0 to 0.99, alternatively from 0 to 0.9, alternatively from 0.9 to 0.999, alternatively from 0.9 to 0.999, alternatively from 0.8 to 0.99, alternatively from 0.6 to 0.99. The subscript x' typically has a value of from 0 to 0.9, alternatively from 0 to 0.45, alternatively from 0 to 0.25. The subscript y' typically has a value of from 0 to 0.99, alternatively from 0.25 to 0.8, alternatively from 0.5 to 0.8. The subscript z' typically has a value of from 0 to 0.99, alternatively from 0 to 0.85, alternatively from 0.85 to 0.95, alternatively from 0.6 to 0.85, alternatively from 0.4 to 0.65, alternatively from 0.2 to 0.5, alternatively from 0.1 to 0.45, alternatively from 0 to 0.25, alternatively from 0 to 0.15.

As set forth above, the condensation-curable silicone composition further comprises the organosilicon compound (B'). The organosilicon compound (B') may be linear, branched, cyclic, or resinous. In one embodiment, the organosilicon compound (B') has the formula $R^1_q SiX_{4-q}$, wherein $R^1$ is defined above, X is a hydrolysable group, and q is 0 or 1.

Specific examples of organosilicon compounds (B') include alkoxy silanes such as $MeSi(OCH_3)_3$, $CH_3Si(OCH_2CH_3)_3$, $CH_3Si(OCH_2CH_2CH_3)_3$, $CH_3Si[O(CH_2)_3CH_3]_3$, $CH_3CH_2Si(OCH_2CH_3)_3$, $C_6H_5Si(OCH_3)_3$, $C_6H_5CH_2Si(OCH_3)_3$, $C_6H_5Si(OCH_2CH_3)_3$, $CH_2=CHSi(OCH_3)_3$, $CH_2=CHCH_2Si(OCH_3)_3$, $CF_3CH_2CH_2Si(OCH_3)_3$, $CH_3Si(OCH_2CH_2OCH_3)_3$, $CF_3CH_2CH_2Si(OCH_2CH_2OCH_3)_3$, $CH_2=CHSi(OCH_2CH_2OCH_3)_3$, $CH_2=CHCH_2Si(OCH_2CH_2OCH_3)_3$, $C_6H_5Si(OCH_2CH_2OCH_3)_3$, $Si(OCH_3)_4$, $Si(OC_2H_5)_4$, and $Si(OC_3H_7)_4$; organoacetoxysilanes such as $CH_3Si(OCOCH_3)_3$, $CH_3CH_2Si(OCOCH_3)_3$, and $CH_2=CHSi(OCOCH_3)_3$; organoiminooxysilanes such as $CH_3Si[O-N=C(CH_3)CH_2CH_3]_3$, $Si[O-N=C(CH_3)CH_2CH_3]_4$, and $CH_2=CHSi[O-N=C(CH_3)CH_2CH_3]_3$; organoacetamidosilanes such as $CH_3Si[NHC(=O)CH_3]_3$ and $C_6H_5Si[NHC(=O)CH_3]_3$; amino silanes such as $CH_3Si[NH(s-C_4H_9)]_3$ and $CH_3Si(NHC_6H_{11})_3$; and organoaminooxysilanes.

The organosilicon compound (B') can be a single silane or a mixture of two or more different silanes, each as described above. Also, methods of preparing tri- and tetrafunctional silanes are well known in the art; many of these silanes are commercially available.

When present, the concentration of the organosilicon compound (B') in the condensation-curable silicone composition is sufficient to cure (cross-link) the organopolysiloxane (A'). The particular amount of the organosilicon compound (B') utilized depends on the desired extent of cure, which generally increases as the ratio of the number of moles of silicon-bonded hydrolysable groups in the organosilicon compound (B') to the number of moles of silicon-bonded hydroxy groups in the organopolysiloxane (A') increases. The optimum amount of the organosilicon compound (B') can be readily determined by routine experimentation.

The condensation catalyst (C') can be any condensation catalyst typically used to promote condensation of silicon-bonded hydroxy (silanol) groups to form Si—O—Si linkages. Examples of condensation catalysts include, but are not limited to, amines; and complexes of lead, tin, zinc, and iron with carboxylic acids. In particular, the condensation catalyst ($C^1$) can be selected from tin(II) and tin(IV) compounds such as tin dilaurate, tin dioctoate, and tetrabutyl tin; and titanium compounds such as titanium tetrabutoxide.

When present, the concentration of the condensation catalyst (C') is typically from 0.1 to 10% (w/w), alternatively from 0.5 to 5% (w/w), alternatively from 1 to 3% (w/w), based on the total weight of the organopolysiloxane (A') in the condensation-curable silicone composition.

When the condensation-curable silicone composition includes the condensation catalyst (C'), the condensation-curable silicone composition is typically a two-part composition where the organopolysiloxane (A') and condensation catalyst (C') are in separate parts. In this embodiment, the organosilicon compound (B') is typically present along with the condensation catalyst (C'). Alternatively still, the condensation-curable silicone composition may be a three-part composition, where the organopolysiloxane (A'), the organosilicon compound (B') and condensation catalyst (C') are in separate parts.

In these or other embodiments, at least one of the heat-curable silicone compositions comprises a free radical-curable silicone composition. In one embodiment, the free radical-curable silicone composition comprises (A") an organopolysiloxane having an average of at least two silicon-bonded unsaturated groups and (C") an organic peroxide.

The organopolysiloxane (A") may be linear, branched, cyclic, or resinous. In particular, the organopolysiloxane (A") may comprise any combination of M, D, T, and Q units, as with the organopolysiloxane (A') and the organosilicon compound (B') disclosed above.

The particular organopolysiloxane (A") may be selected based on desired properties of the 3D article and layers during the inventive method. For example, it may be desirable for the layers to be in the form of an elastomer, a gel, a resin, etc., and selecting the components of the heat-curable silicone composition allows one of skill in the art to achieve a range of desirable properties.

For example, in certain embodiments, the organopolysiloxane (A") comprises a silicone resin, which typically comprises T and/or Q units in combination with M and/or D units. When the organopolysiloxane (A") comprises a silicone resin, the silicone resin may be a DT resin, an MT resin, an MDT resin, a DTQ resin, an MTQ resin, an MDTQ resin, a DQ resin, an MQ resin, a DTQ resin, an MTQ resin, or an MDQ resin. Generally, when the hydrosilylation-curable silicone composition comprises a resin, the layer(s) and resulting 3D article have increased rigidity.

Alternatively, in other embodiments, the organopolysiloxane (A") comprises repeating D units. Such organopolysiloxanes are substantially linear but may include some branching attributable to T and/or Q units. Alternatively, such organopolysiloxanes are linear. In these embodiments, the layer(s) and resulting 3D article are elastomeric.

The silicon-bonded unsaturated groups of the organopolysiloxane (A") may be pendent, terminal, or in both positions. The silicon-bonded unsaturated groups may include ethylenic unsaturation in the form of double bonds and/or triple bonds. Exemplary examples of silicon-bonded unsaturated groups include silicon-bonded alkenyl groups and silicon-bonded alkynyl groups.

In a specific embodiment, the organopolysiloxane (A") has the general formula:

$$(R^1R^4_2SiO_{1/2})_{w''}(R^4_2SiO_{2/2})_{x''}(R^4SiO_{3/2})_{y''}(SiO_{4/2})_{z''} \quad \text{(III)}$$ 

wherein each $R^1$ is defined above and each $R^4$ is independently selected from $R^1$ and an unsaturated group, with the proviso that at least two of $R^4$ are unsaturated groups, and w", x", y", and z" are mole fractions such that w"+x"+y"+z"=1. As understood in the art, for linear organopolysiloxanes, subscripts y" and z" are generally 0, whereas for resins, subscripts y" and/or z">0. Various alternative embodiments are described below with reference to w", x", y" and z". In these embodiments, the subscript w" may have a value of from 0 to 0.9999, alternatively from 0 to 0.999, alternatively from 0 to 0.99, alternatively from 0 to 0.9, alternatively from 0.9 to 0.999, alternatively from 0.9 to 0.999, alternatively from 0.8 to 0.99, alternatively from 0.6 to 0.99. The subscript x" typically has a value of from 0 to 0.9, alternatively from 0 to 0.45, alternatively from 0 to 0.25. The subscript y" typically has a value of from 0 to 0.99, alternatively from 0.25 to 0.8, alternatively from 0.5 to 0.8. The subscript z" typically has a value of from 0 to 0.99, alternatively from 0 to 0.85, alternatively from 0.85 to 0.95, alternatively from 0.6 to 0.85, alternatively from 0.4 to 0.65, alternatively from 0.2 to 0.5, alternatively from 0.1 to 0.45, alternatively from 0 to 0.25, alternatively from 0 to 0.15.

The alkenyl groups represented by $R^4$, which may be the same or different, are as defined and exemplified in the description of $R^2$ above. The alkynyl groups represented by $R^4$, which may be the same or different, typically have from 2 to about 10 carbon atoms, alternatively from 2 to 8 carbon atoms, and are exemplified by, but are not limited to, ethynyl, propynyl, butynyl, hexynyl, and octynyl.

The free radical-curable silicone composition can further comprise an unsaturated compound selected from (i) at least one organosilicon compound having at least one silicon-bonded alkenyl group per molecule, (ii) at least one organic compound having at least one aliphatic carbon-carbon double bond per molecule, and (iii) mixtures comprising (i) and (ii). The unsaturated compound can have a linear, branched, or cyclic structure.

The organosilicon compound (i) can be an organosilane or an organosiloxane. The organosilane can be a monosilane, disilane, trisilane, or polysilane. Similarly, the organosiloxane can be a disiloxane, trisiloxane, or polysiloxane. Cyclosilanes and cyclosiloxanes typically have from 3 to 12 silicon atoms, alternatively from 3 to 10 silicon atoms, alternatively from 3 to 4 silicon atoms. In acyclic polysilanes and polysiloxanes, the silicon-bonded alkenyl group(s) can be located at terminal, pendant, or at both terminal and pendant positions.

Specific examples of organosilanes include, but are not limited to, silanes having the following formulae:

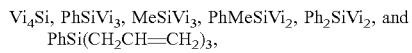

wherein Me is methyl, Ph is phenyl, and Vi is vinyl.

Specific examples of organosiloxanes include, but are not limited to, siloxanes having the following formulae:

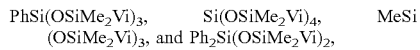

wherein Me is methyl, Vi is vinyl, and Ph is phenyl.

The organic compound can be any organic compound containing at least one aliphatic carbon-carbon double bond per molecule, provided the compound does not prevent the organopolysiloxane (A") from curing to form a silicone resin film. The organic compound can be an alkene, a diene, a triene, or a polyene. Further, in acyclic organic compounds, the carbon-carbon double bond(s) can be located at terminal, pendant, or at both terminal and pendant positions.

The organic compound can contain one or more functional groups other than the aliphatic carbon-carbon double bond. Examples of suitable functional groups include, but are not limited to, —O—, >C=O, —CHO, —CO$_2$—, —C≡N, —NO$_2$, >C=C<, —C≡C—, —F, —Cl, —Br, and —I. The suitability of a particular unsaturated organic compound for use in the free-radical curable silicone composition of the present invention can be readily determined by routine experimentation.

Examples of organic compounds containing aliphatic carbon-carbon double bonds include, but are not limited to, 1,4-divinylbenzene, 1,3-hexadienylbenzene, and 1,2-diethenylcyclobutane.

The unsaturated compound can be a single unsaturated compound or a mixture comprising two or more different unsaturated compounds, each as described above. For example, the unsaturated compound can be a single organosilane, a mixture of two different organosilanes, a single organosiloxane, a mixture of two different organosiloxanes, a mixture of an organosilane and an organosiloxane, a single organic compound, a mixture of two different organic compounds, a mixture of an organosilane and an organic compound, or a mixture of an organosiloxane and an organic compound.

The organic peroxide (C") is utilized as a free radical initiator to initiate polymerization of the organopolysiloxane (A"). Examples of organic peroxides include, diaroyl peroxides such as dibenzoyl peroxide, di-p-chlorobenzoyl peroxide, and bis-2,4-dichlorobenzoyl peroxide; dialkyl peroxides such as di-t-butyl peroxide and 2,5-dimethyl-2,5-di-(t-butylperoxy)hexane; diaralkyl peroxides such as dicumyl peroxide; alkyl aralkyl peroxides such as t-butyl cumyl peroxide and 1,4-bis(t-butylperoxyisopropyl)benzene; and alkyl aroyl peroxides such as t-butyl perbenzoate, t-butyl peracetate, and t-butyl peroctoate.

The organic peroxide (C") can be a single peroxide or a mixture comprising two or more different organic peroxides. The concentration of the organic peroxide is typically from 0.1 to 5% (w/w), alternatively from 0.2 to 2% (w/w), based on the weight of the organopolysiloxane (A").

The free radical-curable silicone composition may be a two-part composition where the organopolysiloxane (A") and organic peroxide (C") are in separate parts.

In these or other embodiments, at least one of the heat-curable silicone compositions comprises a ring opening reaction-curable silicone composition. In various embodiments, the ring opening reaction-curable silicone composition comprises (A''') an organopolysiloxane having an average of at least two epoxy-substituted groups per molecule and (C''') a curing agent. However, the ring opening reaction-curable silicone composition is not limited specifically to epoxy-functional organopolysiloxanes. Other examples of ring opening reaction-curable silicone compositions include those comprising silacyclobutane and/or benzocyclobutene.

The organopolysiloxane (A''') may be linear, branched, cyclic, or resinous. In particular, the organopolysiloxane (A''') may comprise any combination of M, D, T, and Q units, as with the organopolysiloxane (A') and the organosilicon compound (B') disclosed above.

The particular organopolysiloxane (A''') may be selected based on desired properties of the 3D article and layers during the inventive method. For example, it may be desirable for the layers to be in the form of an elastomer, a gel, a resin, etc., and selecting the components of the heat-curable silicone composition allows one of skill in the art to achieve a range of desirable properties.

For example, in certain embodiments, the organopolysiloxane (A''') comprises a silicone resin, which typically comprises T and/or Q units in combination with M and/or D units. When the organopolysiloxane (A''') comprises a silicone resin, the silicone resin may be a DT resin, an MT resin, an MDT resin, a DTQ resin, an MTQ resin, an MDTQ resin, a DQ resin, an MQ resin, a DTQ resin, an MTQ resin, or an MDQ resin. Generally, when the hydrosilylation-curable silicone composition comprises a resin, the layer(s) and resulting 3D article have increased rigidity.

Alternatively, in other embodiments, the organopolysiloxane (A''') comprises repeating D units. Such organopolysiloxanes are substantially linear but may include some branching attributable to T and/or Q units. Alternatively, such organopolysiloxanes are linear. In these embodiments, the layer(s) and resulting 3D article are elastomeric.

The epoxy-substituted groups of the organopolysiloxane (A''') may be pendent, terminal, or in both positions. "Epoxy-substituted groups" are generally monovalent organic groups in which an oxygen atom, the epoxy substituent, is directly attached to two adjacent carbon atoms of a carbon chain or ring system. Examples of epoxy-substituted organic groups include, but are not limited to, 2,3-epoxypropyl, 3,4-epoxybutyl, 4,5-epoxypentyl, 2-glycidoxyethyl, 3-glycidoxypropyl, 4-glycidoxybutyl, 2-(3,4-epoxycylohexyl)ethyl, 3-(3,4-epoxycylohexyl)propyl, 2-(3,4-epoxy-3-methylcylohexyl)-2-methylethyl, 2-(2,3-epoxycylopentyl)ethyl, and 3-(2,3 epoxycylopentyl)propyl.

In a specific embodiment, the organopolysiloxane (A''') has the general formula:

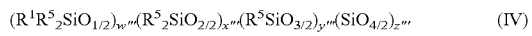

$$(R^1R^5{}_2SiO_{1/2})_{w'''}(R^5{}_2SiO_{2/2})_{x'''}(R^5SiO_{3/2})_{y'''}(SiO_{4/2})_{z'''} \quad (IV)$$

wherein each $R^1$ is defined above and each $R^5$ is independently selected from $R^1$ and an epoxy-substituted group, with the proviso that at least two of $R^5$ are epoxy-substituted groups, and w''', x''', y''', and z''' are mole fractions such that w'''+x'''+y'''+z'''=1. As understood in the art, for linear organopolysiloxanes, subscripts y''' and z''' are generally 0, whereas for resins, subscripts y''' and/or z'''>0. Various alternative embodiments are described below with reference to w''', x''', y''' and z'''. In these embodiments, the subscript w''' may have a value of from 0 to 0.9999, alternatively from 0 to 0.999, alternatively from 0 to 0.99, alternatively from 0 to 0.9, alternatively from 0.9 to 0.999, alternatively from 0.9 to 0.999, alternatively from 0.8 to 0.99, alternatively from 0.6 to 0.99, The subscript x''' typically has a value of from 0 to 0.9, alternatively from 0 to 0.45, alternatively from 0 to 0.25. The subscript y''' typically has a value of from 0 to 0.99, alternatively from 0.25 to 0.8, alternatively from 0.5 to 0.8. The subscript z''' typically has a value of from 0 to 0.99, alternatively from 0 to 0.85, alternatively from 0.85 to 0.95, alternatively from 0.6 to 0.85, alternatively from 0.4 to 0.65, alternatively from 0.2 to 0.5, alternatively from 0.1 to 0.45, alternatively from 0 to 0.25, alternatively from 0 to 0.15.

The curing agent (C''') can be any curing agent suitable for curing the organopolysiloxane (A'''). Examples of curing agents (C''') suitable for that purpose include phenolic compounds, carboxylic acid compounds, acid anhydrides, amine compounds, compounds containing alkoxy groups, or mixtures thereof or partial reaction products thereof. More specifically, examples of curing agents (C''') include tertiary amine compounds, such as imidazole; quaternary amine compounds; phosphorus compounds, such as phosphine; aluminum compounds, such as organic aluminum compounds; and zirconium compounds, such as organic zirconium compounds. Furthermore, either a curing agent or curing catalyst or a combination of a curing agent and a curing catalyst can be used as the curing agent (C''').

The ratio of the curing agent (C''') to the organopolysiloxane (A''') is not limited. In certain embodiments, this ratio is from 0.1-500 parts by weight of the curing agent (C''') per 100 parts by weight of the organopolysiloxane (A''').

Any of the heat-curable silicone compositions may optionally and independently further comprise additional ingredients or components, especially if the ingredient or component does not prevent the organosiloxane of the composition from curing. Examples of additional ingredients include, but are not limited to, fillers; inhibitors; adhesion promoters; dyes; pigments; anti-oxidants; carrier vehicles; heat stabilizers; flame retardants; thixotroping agents; flow control additives; fillers, including extending and reinforcing fillers; and cross-linking agents. In various embodiments, the composition further comprises ceramic powder. The amount of ceramic powder can vary and may depend on the 3D printing process being utilized.

In certain embodiments, the heat-curable silicone compositions are shear thinning. Compositions with shear thinning properties may be referred to as psuedoplastics. As understood in the art, compositions with shear thinning properties are characterized by having a viscosity which decreases upon an increased rate of shear strain. Said differently, viscosity and shear strain are inversely proportional for shear thinning compositions. When the heat-curable silicone compositions are shear thinning, the heat-curable silicone compositions are particularly well suited for printing, especially when a nozzle or other dispense mechanism is utilized. A specific example of a shear-thing heat-curable silicone composition is XIAMETER® 9200 LSR, commercially available from Dow Corning Corporation of Midland, Mich.

Any of the heat-curable silicone compositions described above may be a single part or a multi-part composition, as described above with reference to certain heat-curable silicone compositions. Certain heat-curable silicone compositions are highly reactive such that multi-part compositions prevent premature mixing and curing of the components. The multi-part composition may be, for example, a two-part system, a three-part system, etc. contingent on the selection of the heat-curable silicone composition and the components thereof. Any component of the heat-curable silicone composition may be separate from and individually controlled with respect to the remaining components.

In certain embodiments, when the heat-curable silicone compositions are multi-part heat-curable silicone compositions, the separate parts of the multi-part heat-curable silicone composition may be mixed in a dispense printing nozzle, e.g. a dual dispense printing nozzle, prior to and/or during printing. Alternatively, the separate parts may be combined immediately prior to printing. Alternatively still, the separate parts may be combined after exiting the dispense printing nozzle, e.g. by crossing printing streams or by mixing the separate parts as the layers are formed.

The composition including at least components A), B), and C) can be of various viscosities. In certain embodiments, the composition has a viscosity less than 500, less than 250, or less than 100, centistokes at 25° C., alternatively a viscosity of from 1 to 1,000,000 centistokes at 25° C., alternatively from 1 to 100,000 centistokes at 25° C., alternatively from 1 to 10,000 centistokes at 25° C. Viscosity of the composition can be changed by altering the amounts and/or molecular weight of one or more components. Viscosity may be adjusted to match components of the 3D printer, particularly any nozzle or dispensing mechanism, to control heat or speed or other parameters associated with 3D printing. As readily understood in the art, kinematic viscosity may be measured in accordance with ASTM D-445

(2011), entitled "Standard Test Method for Kinematic Viscosity of Transparent and Opaque Liquids (and Calculation of Dynamic Viscosity)."

A 3D article can be formed according to the method. Specifically, the 3D article can be formed with the heat-curable silicone compositions and as described above with the inventive method. The 3D article can be of various sizes and shapes and is not limited.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims. Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The following examples, illustrating compositions and their reaction products, are intended to illustrate and not to limit the invention.

Heat-curable silicone compositions are prepared and printed via a 3D printer in accordance with this disclosure.

Preparation Example 1

An off-the-shelf heat-curable silicone composition is modified. In particular, the off-the-shelf heat-curable silicone composition is Sylgard® 184, commercially available from Dow Corning Corporation of Midland, Mich. Sylgard® 184 is generally a two-part composition (hydrosilylation-curable) in which the parts are mixed at a 10:1 ratio (base:curing agent) as disclosed in the associated Product Data Sheets for Sylgard® 184. However, Sylgard® 184 is modified to provide a 1:1 ratio (base:curing agent) of the parts. Further, the catalyst is a Pt4 catalyst and the inhibitor is 1-ethynyl-1-cyclohexanol. The catalyst, inhibitor, and curing agent levels were modified to achieve a desired cure time. In particular, the catalyst is present in an amount of from 0.25 to 2 wt %; the inhibitor is present in an amount of from 0.5 to 2.5 wt %; and the curing agent was present in an amount of from 2.5 to 10 wt %; each based on the total weight of the modified heat-curable silicone composition.

Example 1

The heat-curable silicone composition of Preparation Example 1 is printed and cured to form a 3D article. In particular, XY commands are controlled by the program while Z commands are controlled manually with a scissor lift. The syringe is depressed by a motor controlled by the program.

The 3D printer utilized is a RepRap 3D Printer controlled by a Azteeg X3 microcontroller, with Makerslide linear rails, and NEMA 17 stepper motors driving ¼ to 20" ACME lead screws for precise motion control. The Makerslide linear rails are held together with 1" t-slot aluminum extrusions and custom designed 3D printed parts. The heat-curable silicone composition is premixed and degassed before loading into a standard 10 mL syringe with an 18-24 gauge luer lock needle. The 10 mL syringe including the heat-curable silicone composition is placed on a moving carriage designed with a direct drive material extrusion system to push the heat-curable silicone composition out of the syringe in a controlled manner. The printer is controlled using open source 3D printer control software (Repetier Host). Standard ABS filament settings are used with the following changes: all print speeds are changed to 10 mm/s movements; and filament diameter setting is changed to 5-8 mm. No heat is applied to the syringe at the time of printing. Instead, the aluminum build plate is lined with a sheet of aluminum foil and heated with a silicone heat pad. The aluminum foil is removed from the base plate and placed in an oven at 120-140° C. for ~5 minutes to cure ever other layer. Four layers are printed to give an object, and the object is placed in the oven for ~30 minutes at 120-140° C. to ensure full cure and to give the 3D article.

Example 2

The heat-curable silicone composition of Preparation Example 1 is printed and cured to form a 3D article. The same process as described in Example 1 is carried out. However, the heat-curable silicone composition is printed into a heated bath at 140° C., and the syringe is not heated. The heat-curable silicone composition cured in the heated bath to give a 3D article. The heated bath utilizes a silicone heat transfer fluid commercially available from Dow Corning Corporation of Midland, Mich. under the tradename Dow Corning® 200 fluid.

Example 3

The same process as in Example 2 is carried out in Example 3, except the heat-curable silicone composition utilized is XIAMETER® rbl-9200-50, commercially available from Dow Corning Corporation of Midland, Mich.

Example 4

The same process as in Example 3 is carried out in Example 4, except the heat-curable silicone once printed is cured in an oven rather than a heated bath to give the 3D article.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A method of forming a three-dimensional (3D) article, said method comprising:
   I) printing a first heat-curable silicone composition with a 3D printer to form a layer, wherein the first heat-curable silicone composition is not heated during printing in I);
   II) heating the layer to form an at least partially cured layer;
   III) printing a second heat-curable silicone composition on the at least partially cured layer with the 3D printer to form a subsequent layer, wherein the second heat-curable silicone composition is not heated during printing in III);
   IV) heating the subsequent layer to form an at least partially cured subsequent layer; and,
   V) optionally, repeating steps III) and IV) with independently selected heat-curable silicone composition(s) for any additional layer(s) to form the 3D article;
      wherein the first and second heat-curable silicone compositions are the same as or different from one another, wherein the first and second heat-curable silicone compositions are not cured via irradiation; and
      wherein the first and second heat-curable silicone compositions are independently selected from condensation-curable silicone compositions, hydrosilylation-curable silicone compositions, free radical-curable silicone compositions, and dual-cure silicone compositions.

2. The method according to claim 1, wherein steps II) and IV) are independently selected from (i) conductive heating via a substrate on which the layer is printed; (ii) heating the particular heat-curable silicone composition via the 3D printer or a component thereof; (iii) infrared heating; (iv) electromagnetic heating; (v) a heating bath with a heat transfer fluid; (vi) heating from an exothermic reaction of the particular heat-curable silicone composition; (vii) magnetic heating; or (viii) any combination of (i) to (vii).

3. The method according to claim 1, wherein the first and second heat-curable silicone compositions are the same.

4. The method according to claim 1, wherein the first and/or second heat-curable silicone composition(s) comprise(s) a hydrosilylation-curable silicone composition comprising (A) an organopolysiloxane having an average of at least two silicon-bonded alkenyl groups or silicon-bonded hydrogen atoms per molecule; (B) an organosilicon compound having an average of at least two silicon-bonded hydrogen atoms or silicon-bonded alkenyl groups per molecule capable of reacting with the silicon-bonded alkenyl groups or silicon-bonded hydrogen atoms in the organopolysiloxane (A); and (C) a hydrosilylation catalyst.

5. The method according to claim 1, wherein the first and/or second heat-curable silicone composition(s) comprise(s) a condensation-curable silicone composition comprising (A') an organopolysiloxane having an average of at least two silicon-bonded hydroxyl or hydrolysable groups per molecule; optionally (B') an organosilicon compound having an average of at least two silicon-bonded hydrogen atoms, hydroxyl groups, or hydrolysable groups per molecule; and (C') a condensation catalyst; and optionally, wherein the condensation-curable silicone composition is a multipart composition, wherein component (A') is in a first part, component (B') is in a second part separate from the first part, and component (C') is in the second part and/or in a third part separate from the first and second parts.

6. The method according to claim 1, wherein the first and/or second heat-curable silicone composition(s) comprise(s) a free radical-curable silicone composition comprising (A") an organopolysiloxane having an average of at least two silicon-bonded unsaturated groups and (C") an organic peroxide.

7. The method according to claim 1, wherein the first and second heat-curable silicone compositions are different from one another.

8. The method according to claim 1, wherein the first and/or second heat-curable silicone composition(s) is(are) a multi-part heat-curable silicone composition comprising at least a first part and a second part separate from the first part; and optionally, wherein the separate parts of the multi-part heat-curable silicone composition are mixed in a dual dispense printing nozzle prior to printing.

9. The method according to claim 1, wherein the 3D printer is selected from a fused filament fabrication printer, a selective laser sintering printer, a selective laser melting printer, a stereolithography printer, a powder bed (binder jet) printer, a material jet printer, a direct metal laser sintering printer, an electron beam melting printer, a laminated object manufacturing deposition printer, a directed energy deposition printer, a laser powder forming printer, a polyjet printer, an ink-jetting printer, a material jetting printer, and a syringe extrusion printer.

10. The method according to claim 1, wherein the at least partially cured layer formed in step II) retains its shape upon exposure to ambient conditions.

11. The method according to claim 1, wherein heating via steps II) and IV) is carried out at a temperature independently selected from above ambient temperature to 300° C.

12. The method according to claim 1, wherein the first and/or second heat-curable composition(s) is(are) shear thinning.

13. A 3D article formed in accordance with the method of claim 1.

\* \* \* \* \*